United States Patent [19]
Murray et al.

[11] 3,776,309
[45] Dec. 4, 1973

[54] VISCOUS SURFACTANT WATER FLOODING

[75] Inventors: Kenneth J. Murray, East Brunswick; Don J. Hopkins, Westfield; Peter B. Lederman, Providence, all of N.J.

[73] Assignee: Esso Production Research Company, Houston, Tex.

[22] Filed: May 28, 1971

[21] Appl. No.: 148,127

Related U.S. Application Data

[63] Continuation of Ser. No. 845,126, July 23, 1969, abandoned.

[52] U.S. Cl. .................................. 166/273, 166/274
[51] Int. Cl. ............................................ E21b 43/22
[58] Field of Search .................. 166/275, 274, 273, 166/305 R; 252/8.55 D

[56] References Cited
UNITED STATES PATENTS

| | | | |
|---|---|---|---|
| 3,361,313 | 1/1968 | Riggs, Jr. et al. | 166/275 X |
| 3,302,713 | 2/1967 | Ahearn et al. | 166/275 X |
| 2,593,497 | 4/1952 | Spearow | 166/306 X |
| 3,315,744 | 4/1967 | Dunlap | 166/274 X |
| 3,373,808 | 3/1968 | Patton | 166/275 |
| 3,391,736 | 7/1968 | Abdo | 166/275 |
| 3,434,542 | 3/1969 | Dotson et al. | 166/273 |
| 3,468,377 | 9/1969 | Dunlap et al. | 166/274 |
| 3,515,213 | 6/1970 | Prats | 166/306 X |
| 3,491,834 | 1/1970 | Ahearn et al. | 166/273 |

*Primary Examiner*—Stephen J. Novosad
*Attorney*—Lewis H. Eatherton et al.

[57] ABSTRACT

A method of treating a formation by means of a well using a novel composition as a waterflood additive. The method is primarily used as a method for recovering oil from the formation, but also has utility in increasing the water injectivity of a well by reducing the formation's residual oil saturation. The composition is prepared by reacting hydrocarbons of the type occurring in a 700°–1,100°F boiling range fraction of a petroleum crude with gaseous $SO_3$ under specific sulfonating conditions. The composition is essentially a mixture of hydrocarbon sulfonates which has the properties of reducing the interfacial tension and increasing the viscosity of certain aqueous systems.

25 Claims, 8 Drawing Figures

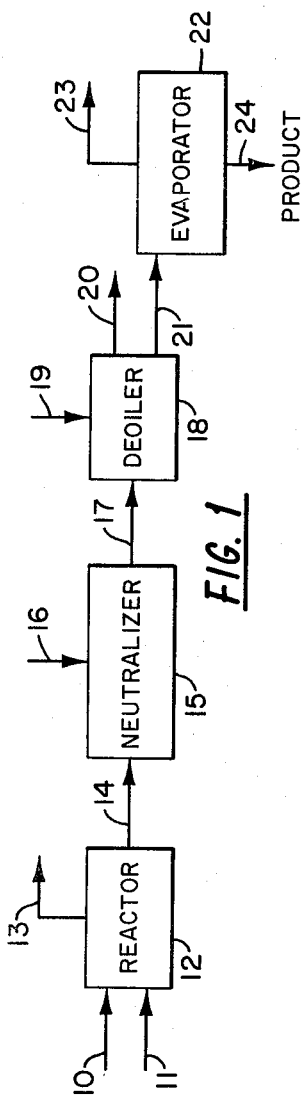
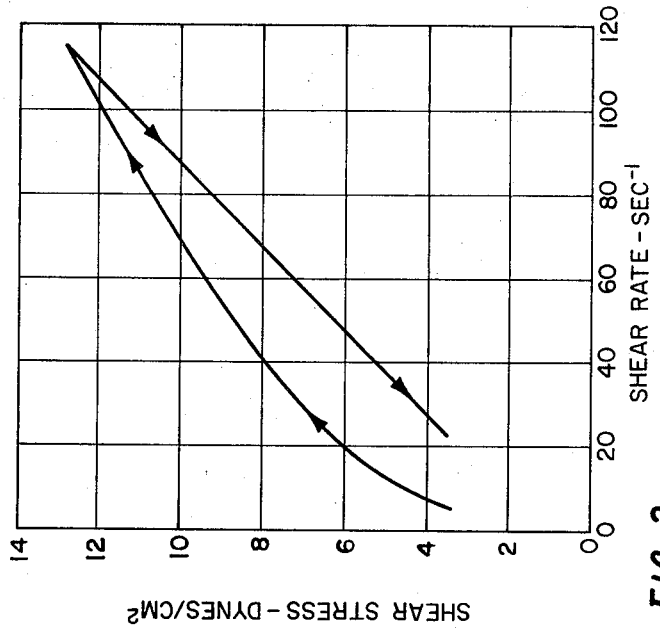
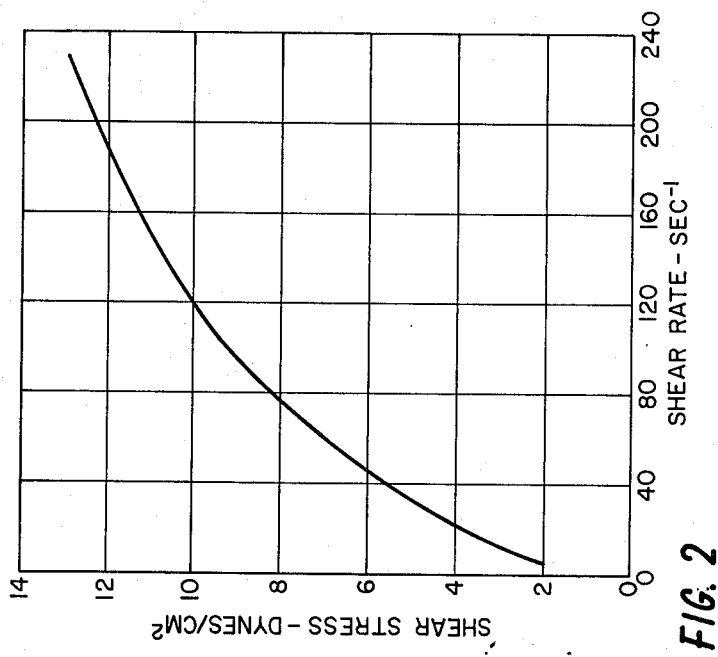
DON J. HOPKINS  INVENTORS
PETER B. LEDERMAN
KENNETH J. MURRAY
BY
*Lewis H. Catherton*
ATTORNEY

DON J. HOPKINS
PETER B. LEDERMAN
KENNETH J. MURRAY
INVENTORS

BY

Lewis H. Eatherton
ATTORNEY

VISCOUS SURFACTANT WATER FLOODING

CROSS-REFERENCE TO RELATED APPLICATIONS

This application is a continuation of our application Ser. No. 845,126, filed July 23, 1969, and now abandoned.

BACKGROUND OF THE INVENTION

1. Field of the Invention

The invention relates to a process for recovering oil from a subterranean formation by placing a fluid into the formation by means of a well. This invention also relates to a composition for well treating.

2. Description of the Prior Art

The petroleum industry has recognized for many years that only a small fraction of the original oil in place in a reservoir is expelled by natural mechanisms. It is also well known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most economical and widely practiced of secondary recovery methods. In such a process, water is injected through an input well to drive oil from the formation and to an offset producing well. Much of the current work in secondary recovery technology has been directed toward improving the efficiency of waterflooding processes.

Surface active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to sufficiently deform to pass through narrow constrictions in the pore channels. When surface-active agents are added to the flooding water, they lower the interfacial tension between the water and the reservoir oil and permit the oil droplets to deform and flow with the flood water. It is generally conceded that the interfacial tension between the flood water and the reservoir oil must be reduced to less than 0.1 dynes/cm for effective recovery.

While conventional surfactant waterflooding may be effective in obtaining additional oil from subterranean oil reservoirs, it has a number of shortcomings which detract seriously from its value. Foremost among these shortcomings is the tendency of surfactant flood water to finger through the reservoir and to bypass substantial portions of oil. This fingering tendency of a surfactant waterflood is usually explained by the fact that the surfactant flood water has the ability to move through the reservoir at a much faster rate than the oil which it is displacing. The fingering and bypassing tendencies of the surfactant flood water is due in part to its relatively low viscosity.

The mobility ratio of a flooding system is a mathematical relationship that has been developed in recent years to help explain the behavior of fluids flowing through porous media such as oil reservoirs. When the mobility ratio equation is applied to a "flooding" type operation within a reservoir, it reads as follows:

$$M_o/M_e = \mu_e/\mu_o \times K_o/K_e$$

where $M_o$ is the mobility of the oil to the reservoir in question $M_e$ is the mobility of the driving fluid to the reservoir in question $\mu_o$ is the viscosity of the driven oil $\mu_e$ is the viscosity of the driving fluid $K_e$ is the relative permeability of the reservoir to the driving fluid in the presence of residual oil $K_o$ is the relative permeability of the reservoir to the oil in the presence of residual driving fluid.

This equation is perhaps best explained by stating that when the mobility ratio of oil to the driving fluid is equal to one, the oil and the driving fluid move through the reservoir with equal ease. When the mobility ratio is less than one, there is a tendency for driving fluid to bypass the oil and finger to the producing well.

It should be noted that crude oils vary greatly in viscosity. Some have viscosities as low as 1 or 2 centipoises and some range up to 1,000 centipoises or greater. Most reservoir oils have a viscosity of up to 10 centipoises at reservoir temperature and pressure. If a surfactant waterflood with a viscosity of approximately 1 centipoise is used to displace oil having a viscosity of 10 centipoises, it can be seen from the mobility ratio equation that there will be a tendency for the driving fluid to finger through the reservoir oil. It has in fact been noted that surfactant waterflooding generally performs less satisfactorily with viscous crude oils than with relatively non-viscous oils.

Several procedures have been suggested to date for improving the mechanics of waterflooding, particularly with the view to reducing the degree of fingering and bypassing. One suggestion has been to increase the viscosity of the water drive relative to the oil by incorporating water-soluble viscous agents within the water. Materials that have been suggested for this purpose include a wide variety of gums, sugars, polymers, and certain sulfonated hydrocarbons. While these materials are effective to an extent in increasing the viscosity of flood water, they are also characterized by serious disadvantages. For example, some of the materials have a tendency to plug formations; some are relatively unstable; some have relatively little thickening effect; and none of the materials have the ability to lower the interfacial tension to desired levels. Additionally, many of these materials are quite expensive, and their use is not feasible from the standpoint of economics.

No material has previously been suggested which will perform both the function of increasing the viscosity to the desired level and the function of satisfactorily reducing the oil-flood water interfacial tension. The materials which have been suggested as beneficial in reducing interfacial tension to desirable levels have little effect on viscosity. The materials which have been suggested as beneficial in increasing the viscosity of the driving fluid are not effective in sharply reducing interfacial tension.

SUMMARY OF THE INVENTION

This invention relates to a method of recovering oil from an oil-bearing formation. A novel composition is added to flood water which is injected into the formation to recover oil. The composition is prepared by sulfonating hydrocarbons of the type occurring in a 700°–1,100°F boiling range fraction of a petroleum crude with gaseous $SO_3$ under specified sulfonating conditions. The flood water additive increases the viscosity of the flood solution and radically lowers the interfacial tension between the reservoir oil and the flood water.

The primary object of this invention is to improve waterflooding processes for recovering oil from a formation.

Another object of this invention is to improve the sweep efficiency of a waterflood process for the recovery of oil.

Another object of this invention is to provide a novel waterflood additive which performs the dual function of increasing the viscosity of the flood water and radically reducing the interfacial tension between the reservoir oil and the flood water.

These and other objects of this invention will be apparent from the following drawings and discussion of the preferred embodiment.

BRIEF DESCRIPTION OF THE DRAWINGS

FIG. 1 is a schematic flow diagram of a process for manufacturing the waterflood additives of this invention.

FIG. 2 is a graph illustrating the pseudoplastic characteristic of aqueous solutions of these compositions.

FIG. 3 is a graph illustrating the thixotropic characteristics of aqueous solutions of these compositions.

DESCRIPTION OF THE PREFERRED EMBODIMENT

Figure 4:
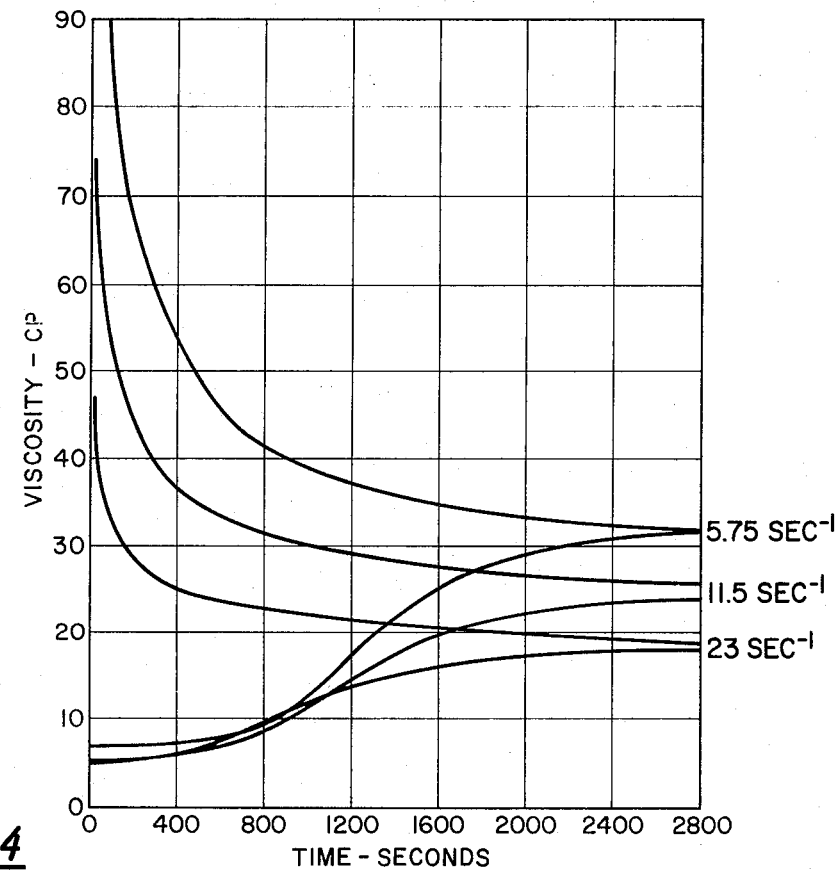
FIG. 4 is a graph illustrating the equilibrium apparent viscosity of these compositions in aqueous solutions.

The waterflood additives employed in the practice of this invention are prepared by sulfonating certai hydrocarbon feedstocks under specific sulfonating conditions. The preferred source of feedstock hydrocarbons is a 700°–1,100°F boiling range fraction of a petroleum crude oil. Such fractions are known generally in the art of petroleum refining as lube oil distillates and may be identified by the ASTM Standard Method of DIstillation, D 1160–61.

In the ASTM method, a petroleum sample is distilled at reduced pressure to prevent cracking and the distilled liquid volume is collected. The distilled volume, expressed as a percent of the original sample volume, is measured at regular volumetric intervals and the distillation temperature is recorded when each such interval has been collected. The distillation is continued until a maximum vapor temperature is reached indicating either complete distillation of the sample or the incidence of cracking.

It should be noted that it is common practice to identify a petroleum fraction as being a 700°–1,100°F boiling range fraction even though such a fraction may have an initial boiling point below 700°F or may not be completely distilled before a maximum vapor temperature is reached. If, however, the first 10 volume percent has a distillation temperature of 700°F or greater and at least 90 percent of the fraction is distilled below 1,100°F, such a fraction is generally said to be a 700°–1,100°F boiling range fraction and is considered to be so for the purposes of this application.

The sulfonation reaction may be carried out on a virgin distillate or any source of sulfonatable hydrocarbons which contains at least a portion of the sulfonatable constituents normally present in a 700°–1,100°F distillate fraction. An unrefined petroleum crude could be employed for instance. As other examples, the original distillate may be subjected to further refining steps such as hydrofining, dewaxing, or solvent extraction. The products of these refining steps are useful as feed stocks for the sulfonation procedure of this invention so long as they contain at least 10 percent by volume of the sulfonatable constituents of the original distillate fraction. Economics generally prohibit the use of feed-stocks having a smaller quantity of sulfonatable constituents. The sulfonatable constituents which occur in a 700°–1,100°F boiling range are primarily aromatic hydrocarbons including alkylated mono-aromatics and alkylated poly-aromatic hydrocarbons.

Solvent extraction such as phenol extraction will concentrate the aromatic constituents of the original virgin distillate. It may be preferred therefore to utilize the extract of such a process as the feed stock in the practice of this invention. Such an extract will be richer in sulfonatable aromatic constituents thatn the original distillate and a smaller volume of feed can be used in the sulfonation procedure to obtain a given yield.

The API gravity of a 700°–1,100°F boiling range fraction is a useful measure of certain desirable characteristics of the feed stock to be sulfonated. It has been found that a virgin distillate having a boiling range within 700°–1,100°F and which has an API gravity between 18°–28° at 60°F has particularly suitable characteristics for sulfonation and, in a more limited embodiment of this invention, such a feed stock is preferred. This distinction is not related merely to the concentration of aromatics found in the various 700°–1,100°F distillate fractions, but is more closely related to the differences in proportions of the various types of aromatic hydrocarbons found within this boiling range and the nature and degree of their alkylation. It should be noted that this API gravity specification relates to the virgin distillate. Other refining processes, such as hydrofining, may change the API gravity of the hydrocarbon stream, but such a stream may still be satisfactory as a feed stock for sulfonation if the virgin distillate had the proper API gravity range.

The average molecular weight of the sulfonatable hydrocarbons which occur in the 700°–1,100°F boiling range fraction of petroleum crude ranges from about 300 to 600 depending on the particular crude chosen for analysis. Various individual hydrocarbons occur within this boiling range, some of which have a molecular weight which is lower than 300. Feed stocks which do not contain at least ten percent by weight of sulfonatable aromatic hydrocarbons having molecular weights between 300 and 600 are generally unsuitable for the practice of this invention.

TABLE I

| Feed stock inspections | Distillate A | Distillate B | Phenol extract C | Phenol extract D |
|---|---|---|---|---|
| Gravity, °API at 60° F | 21.0 | 20.7 | 11.1 | 14.8 |
| Viscosity, SSU at 100° F | 1,200 | | 9,265 | 200 |
| Viscosity, SSU at 210° F | 73.3 | 110.9 | 115.2 | 97.3 |
| ASTM distillation at 10 mm. Hg (corrected to 760 mm.): | | | | |
| Final boiling point, ° F | 964 | [1] 91% | 972 | 990 |
| 5% | 799 | 820 | 724 | 841 |
| 10% | 811 | 847 | 744 | 871 |
| 20% | 827 | 878 | 781 | 883 |
| 50% | 860 | 932 | 828 | 925 |
| 80% | 897 | 981 | 879 | 966 |
| 90% | 920 | 1,006 | 910 | 978 |
| 95% | 937 | | 932 | 990 |
| Aniline point, ° F | 191 | 203 | 86 | 159.0 |
| Silica gel analysis, wt. percent: | | | | |
| Asphaltenes | 0.0 | 0.0 | 0.0 | 0.0 |
| Saturates | 60.0 | 56.2 | 20.2 | 32.1 |
| Aromatics | 38.0 | 38.8 | 70.2 | 67.9 |
| Polar | 2.0 | 5.0 | 9.6 | 0.0 |
| Average molecular weight | 412 | 530 | 392 | 425 |
| Analytical data, wt. percent: | | | | |
| Silica gel plus mass spec.: | | | | |
| Asphaltenes | 0.0 | 0.0 | 0.0 | 0.0 |
| Saturates | 60.0 | 53.2 | 20.2 | 32.1 |
| Paraffins | 2.6 | 2.2 | 0.0 | 5.8 |
| Non condensed naphthenes | 16.1 | 10.0 | 3.1 | 8.1 |
| 2 ring naphthenes | 14.8 | 11.7 | 4.5 | 5.3 |
| 3 ring naphthenes | 12.9 | 13.1 | 4.9 | 4.0 |
| 4 ring naphthenes | 7.7 | 8.6 | 3.9 | 3.3 |
| 5 ring naphthenes | 3.9 | 4.6 | 2.3 | 2.6 |
| 6 ring naphthenes | 2.0 | 3.0 | 1.5 | 3.0 |
| Aromatics | 38.0 | 46.8 | 70.2 | 67.9 |
| 1 ring benzenes | 6.0 | 10.2 | 6.4 | 5.8 |
| Indans | 4.9 | 6.3 | 5.9 | 3.1 |
| Indenes | 6.2 | 7.5 | 9.0 | 4.4 |
| 2 ring naphthalenes | 1.7 | 1.9 | 3.1 | 2.0 |
| Acenaphthenes | 3.4 | 3.9 | 7.9 | 5.2 |
| 3 ring acenaphthylenes | 6.0 | 6.5 | 14.9 | 9.8 |
| Phenanthrenes | 5.9 | 5.3 | 11.3 | 9.8 |
| 4 ring pyrenes | 1.0 | 1.0 | 4.6 | 2.5 |
| Chrysenes | 0.3 | 0.6 | 1.7 | 4.9 |
| Benzothiophenes | 1.2 | 1.4 | 0.2 | 4.6 |
| Dibenzothiophenes | 1.3 | 1.9 | 3.0 | 7.0 |
| Thiophenophenanthrenes | 0.1 | 0.3 | 2.2 | 8.8 |
| Polar | 2.0 | 0.0 | 9.6 | 0.0 |
| Total | 100.0 | 100.0 | 100.0 | 100.0 |

[1] At 1,011° F.

Distillates A and B are vacuum gas-oil distillates of Texas Gulf Coast napthenic crude oils. Phenol Extract C is a phenol extract from Distillate A. Phenol Extract D is a phenol extract of a distillate from a North Louisiana paraffinic crude oil.

Suitable feed stocks are sulfonated with gaseous sulfur trioxide within the ranges described below. The temperature of the reactor effluent may vary broadly from 150° to 375°F. This reactor temperature will be governed primarily by the viscosity of the feed stock, the reactor design and the desired flow rate of feed stock through the reactor. Generally, a reaction temperature of from 250° to 325°F is preferred.

The gaseous sulfur trioxide is introduced to the hydrocarbon feed stock in an inert diluent gas such as air or nitrogen. Sulfur trioxide will preferably be about 5 to 8 percent by volume of the total gaseous feed volume. This percentage is not critical, however, and may vary from as low as 0.5 percent up to approximately 25 percent. The diluent gas should be dried before the sulfur trioxide is introduced to prevent reaction between sulfur trioxide and water vapor.

The treat ratio for the process is the number of pounds of sulfur trioxide for each 100 pounds of hydrocarbon feed. This treat ratio will normally vary between 5 and 30 pounds of $SO_3$ per 100 pounds of hydrocarbon feed stock, but preferably is about 20 pounds per 100.

The average period of time that the sulfonatable material remains in the reactor is termed the "residence time." The residence time varies broadly and depends primarily on the choice of reactor. Short residence times are preferable; approximately 1 second to 5 seconds generally produce superior products. In certain instances, however, the residence time may be several minutes without adverse results.

It is generally preferred to heat the hydrocarbon feed stream and the source of gaseous $SO_3$. The hydrocarbon feed stock is normally maintained at a temperature of from 150° to 210°F. These temperatures will speed the reaction and lower the viscosity of the hydrocarbon feed stock. If the gaseous $SO_3$ is obtained from unstabilized liquid $SO_3$, it is necessary to maintain the liquid at a temperature slightly below its boiling point to prevent the formation of crystalline structures within the liquid. Where the $SO_3$ is derived from the oxidation of elemental sulfur, so-called converter gas, such preheating would be unnecessary.

FIG. 1 and the following specific examples will further illustrate the process of manufacture of the desired product. Turning to this drawing, a suitable petroleum feed in line 10 and a sulfonating agent such as gaseous $SO_3$ and air in line 11 are introduced into the sulfonation reactor 12 where a portion of the petroleum feed is converted into sulfonic acids. Waste gases containing primarily sulfur dioxide, sulfur trioxide, oxygen, and nitrogen are discharged by way of vent line 13.

Thin film reactors are the preferred type of sulfonation reactor to be employed in the practice of this invention. These reactors have the common feature of means for producing a very thin film of hydrocarbon liquid within a reaction zone. Commonly, the reaction zone is cylindrical and the liquid hydrocarbon is distributed as a thin moving film on the inner surface of the cylinder. Gaseous $SO_3$ passes through the center of the cylinder and produces sulfonic acids by reacting with the hydrocarbon film. In the use of such reactors the gaseous $SO_3$ is normally carried in an inert diluent gas such as nitrogen or air. The diluted gas induces turbulence in the film to promote rapid reaction and rapid transfer of heat from the interior of the cylinder to its exterior. Since the reaction between the liquid hydrocarbons and sulfur trioxide is highly exothermic, such reactors are normally provided with a jacket for the circulation of a cooling fluid, such as water.

Certain of these thin film reactors rely solely on the turbulence of the moving gaseous stream to provide intimate contact between the sulfur trioxide and the moving organic liquid film. This type of thin film reactor is commonly called a "falling film" reactor and is typified by the reactors shown in British Pat. No. 1,111,208, and German Pat. No. 1,195,299.

Wiped film reactors are another type of thin film reactor. This class of reactor has a moving agitator within the reaction zone which assists in giving a more intimate contact between the sulfur trioxide and the hydrocarbon liquid. A typical wiped film reactor is disclosed in U.S. Pat. No. 3,427,342. This reactor has an external cylinder with means for distributing a moving, thin film of organic reactant on the internal surface of that cylinder. Concentrically disposed within the external cylinder is an internal cylinder with means for distributing a second moving organic reactant film on the outer surface of this internal cylinder. The diluted gaseous $SO_3$ passes in the annular space between the two moving liquid films. A cylindrical rotor is disposed in the annular space between the external and internal cylinders and extends for a portion of their length. Jackets for cooling water are provided for the internal and external cylinders. When using such a wiped film reactor with the feed stocks of this invention, the desired reaction temperature will range between 150° and 375°F. To maintain such a temperature the water within the cooling jacket should range in temperature from 150° to 200°F. It should be noted that for the practice of this invention, it is not necessary to rapidly quench the reaction products as is suggested in U.S. Pat. No. 3,427,342.

Some specific examples of typical reaction conditions are:

salt will be sodium sulfate where sodium hydroxide is used as the base.

The removal of unreacted oil from surfactants produced from petroleum feed streams is conventional and a number of deoiling methods may be suitably employed. However, in the practice of this invention a single solvent process is preferred. Isopropyl alcohol is introduced through line 19. The ratio of isopropyl alcohol to water in the total mixture should be approximately 4 parts alcohol to 6 parts water. The volume of alcohol-water should be approximately equal to or slightly greater than the volume of the other constituents of the mixture. If insufficient water is present in the neutralized mixture to give this equal volume, 40 percent alcohol solution, additional water may be in-

TABLE II

| Run | Reactor type | Residence time | Feed temperature | SO₃— diluent temperature, °F. | Reactor temperature,[1] °F. | Reactor pressure, p.s.i.g. | Feed stock rate, #/min. | Gas velocity, s.c.f./m. | Treat ratio[2] | SO₃ in total gas, percent |
|---|---|---|---|---|---|---|---|---|---|---|
| 1 | Wiped film as disclosed in U.S. Pat. 3,427,342. | < 1 sec. | 230° F | 118 | 282 | 17.3 | 10 | 136 | 20 | 6.5 |
| 2 | Wiped film as disclosed in U.S. Pat. 3,427,342. | < 1 sec. | 210° F | 120 | 272 | 12 | 10 | 120 | 20 | 5.6 |
| 3 | Falling film as disclosed in German patent 1,195,299. | Approx. 2 min. | Room temp. | 120 | 193 | 12 | 1.50 | 110 | 17.2 | 1.0 |

[1] Measured at the reactor discharge.
[2] SO₃ #/100# feed.

The feed stock employed in Run 1 was a phenol extract of a distillate from a North Louisiana paraffinic crude having specifications corresponding to Extract D, Table I. The feed stocks for Run 2 and 3 were derived from napthenic Texas Gulf Coast crudes. The feed stock for Run 2 was a phenol extract having specifications corresponding to Extract C, Table I. The feed stock for Run 3 was a blend of distillates having specifications corresponding to Distillates A and B, Table I in the ratio of 2.7 volumes of Distillate A to 1 volume of Distillate B.

After the desired degree of sulfonation the reactor product is withdrawn by means of line 14 and generally comprises a mixture of sulfonic acids, unreacted hydrocarbon feed stocks and minor amounts of the gaseous SO₃. The product mixture is then introduced into neutralizer 15 and is neutralized by an aqueous solution of base from line 16.

Neutralization is a conventional technique and many bases both organic and inorganic may be employed. Typical materials that may be employed are the alkali metal hydroxides and carbonates, e.g., lithium hydroxide, sodium hydroxide, sodium carbonate; ammonia; mono-, di-, or trialkanol, amines, e.g., ethanolamine; aliphatic or aromatic amines, e.g., propylamine, benzylamine, aniline; heterocyclics, e.g., pyridine and the like. If the base is inorganic it is normally added in aqueous solution. The preferred bases for neutralization are ammonia and sodium hydroxide. Generally, enough base is added to bring the pH to about 9-11 and neutralization temperatures normally range from 60°-210°F.

The neutralized product is withdrawn by means of line 17 and introduced into the deoiling chamber 18. The product solution at this stage contains sulfonated hydrocarbons, unreacted oil, water and inorganic salts. The water will be about 30-50 percent by volume of the total mixture and comes from the base solution used to neutralize the reactor product. The inorganic salts are the product of reaction between the base and unreacted sulfur trioxide. For example, the inorganic troduced with the alcohol through line 19.

Following introduction of the alcohol solution, the mixture in the deoiling chamber will segregate into two liquid phases. The upper phase will be primarily unreacted oil and will be withdrawn through line 20. The lower phase will contain alcohol, water, sulfonated hydrocarbons, inorganic salts, and lesser quantities of unreacted oil. This lower liquid phase is withdrawn through line 21 and discharged into the evaporation stage.

In the evaporation stage, water and solvent are removed through line 23 and the waterflood additive is discharged through line 24. It should be noted that the evaporation step is not essential to the practice of this invention. The aqueous solution is suitable for direct injection into the oil-bearing formation if desired. Total or partial removal of the water and solvent is generally desired, however, to reduce the bulk of the product.

The dried product is powdery with a coloration ranging from light tan to dark brown. The product is highly soluble in polar liquids, such as water, chloroform and alcohol. It is almost totally insoluble in paraffinic hydrocarbon liquids. The product is highly hygroscopic and will absorb water if exposed to the atmosphere for prolonged periods. Under 45 power magnification, the product particles have a vitreous appearance much like many resinous materials and have no discernible crystalline structure. As shown in Table III, the dried product may contain quantities of unreacted oil and inorganic salts. These constituents have no noticeable effect on the above recited characteristics of the dried product. These characteristics are the same before and after removal of the oil and inorganic salts.

The constituents of the product can be segregated and identified using standard solvent extraction and qualitative analysis techniques. Any remaining water and alcohol is first removed from the product by drying. The dried product is then placed in a solution of 85 volume percent isopropyl alcohol and 15 volume percent water. A portion of the sample will be soluble in the solution and a portion will be insoluble. The insoluble portion is filtered from the solution and set aside for further analysis. The solution containing the alcohol-water soluble fraction is then dried to remove the alcohol water. The dry residue is then placed in pentane. A portion of this residue is insoluble in pentane and is extracted. Qualitative analysis reveals that this insoluble portion is essentially a water-soluble hydrocarbon sulfonate. The pentane-soluble fraction is a hydrocarbon oil having a mass spectrum similar to that of the original feed stock. This fraction appears to be oil which did not react in the sulfonation step.

The fraction of the original sample which was not soluble in the isopropyl alcohol-water solution is then placed in water. A portion is soluble and qualitative analysis reveals that this fraction is essentially inorganic salt, such as $Na_2SO_4$, which was produced by the reaction of excess $SO_3$ and the base during the neutralization step. The portion which was insoluble in water is essentially a hydrocarbon sulfonate having a relatively high equivalent weight. It should be noted that the high equivalent weight sulfonate, while insoluble in water in the presence of the inorganic salts alone, is solubilized in water in the presence of the water-soluble, pentane-insoluble sulfonate. Also the unreacted oil which would otherwise be insoluble in water is soluble in the presence of the sulfonated hydrocarbons.

An analysis of the dried product made under the reaction conditions of Run 1, Table II is typical of the products made in accordance with the teaching of this application. Such an analysis is:

TABLE III

Dried Product Composition

| Constituent | Weight Percent |
|---|---|
| Pentane Insoluble Sulfonate | 68.4 |
| Oil | 14.1 |
| Inorganic Salt (Sodium Sulfate) | 11.0 |
| Water Insoluble Sulfonate | 6.5 |
| Total | 100.0 |

The relative concentrations of these constituents is variable. The concentrations of the pentane-insoluble and water-insoluble sulfonates are primarily dependent on the feed stock employed in the sulfonation reaction. The quantity of unreacted oil is dependent on the efficiency of the sulfonation reaction and the efficiency of the deoiling procedure. The inorganic salt content is a function of the quantity of unreacted $SO_3$ and the quantity of salt removed during processing of the product.

The sulfonates of this invention are the neturalized reaction products of the hydrocarbon feed stocks and gaseous sulfur trioxide. The principal products are believed to be alkyl aryl sulfonates. These compounds contain one or more aromatic rings, one or more aliphatic substituents, one or more $SO_3$ radicals with associated cations such as sodium or ammonium, and minor amounts of other elements such as sulfur and oxygen which are present in the hydrocarbon feed stocks. Sulfone compounds may also be present in the neturalized product. Such compounds have an $SO_2$ radical which links two hydrocarbon groups and such compounds are commonly produced during the reaction between hydrocarbons and sulfur trioxide. All of these compounds, including those containing $SO_3$ radicals and $SO_2$ radicals, are referred to collectively herein as hydrocarbon sulfonates or sulfonates since they are the products of a sulfonation reaction.

The compositions of this invention are readily identifiable by their properties. Hereinafter, the properties of these compositions and the manner of determining these properties are specifically described. However, the methods of determining the properties of these compositions should not be confused with the methods of using these compositions for their intended functions.

The waterflood additives or compositions of this invention have the property of radically increasing the viscosity of aqueous solutions. Even after being sheared at extremely high rates (230 reciprocal seconds), an aqueous solution containing 3 weight percent sodium carbonate and 2.9 weight percent of the product of Table III will have a viscosity of 4–5 centipoises at 26°C. If a comparative solution is prepared without the sulfonates, its viscosity under these conditions would be only slightly greater than 1 centipoise. Such a comparative solution would contain 3 weight percent sodium carbonate, 0.3 weight percent sodium sulfate, 0.4 weight percent hydrocarbon oil, and the remainder water. It will be recognized by those skilled in the art that in preparing such a comparative solution, vigorous agitation may be necessary to get the hydrocarbon oil into solution in the absence of the sulfonates.

In addition to the property of increasing the viscosity if aqueous solutions, the compositions of this invention have the property of imparting unexpected and beneficial rheological characteristics to aqueous solutions. A brief discussion of the rheological properties follows.

Aqueous solutions of the compositions prepared in accordance with the teaching of this application are non-Newtonian. These fluids exhibit pseudoplastic and thixotropic characteristics. The terms "non-Newtonian," and "pseudoplastic," and "thixotropic" refer to the rheological properties of a fluid. These fluid properties are normally measured using a rotational viscosimeter which measures the relationship between rate of shear and shear stress. This device is simply a small cylinder rotating in a large cylinder, the fluid being sheared in the annular space. The torque required for rotation of the cylinder is a measure of the shearing stress and the speed of rotation is a measure of the rate of shear.

The extrusion rheometer is another device for measuring the rheological properties and the meaning of the terms used to describe these properties are perhaps more easily understood with reference to the operation of this device. The extrusion rheometer is a large cylinder with a cylindrical orifice attached to the bottom. The fluid is placed in the cylinder and forced through the orifice by gas pressure in much the same manner that grease is extruded from a grease gun. The pressure imposed on the fluid is a measure of the shearing stress. The quantity of fluid extruded in a given time is a measure of the rate of shear.

The simplest liquids such as water, alcohol, esters, and so forth have Newtonian flow characteristics. Doubling the pressure in the extrusion rheometer will double the flow rate of these materials. When the pressure of shear stress is plotted against the flow rate or rate of shear, a straight line plot is obtained for a Newtonian fluid. The slope of this straight line is the viscosity of the fluid. The slope of the pressure-flow rate line for a material such as methanol will be less than the slope of the line for water, and methanol therefore has a lower viscosity than water.

The viscosity of a Newtonian fluid is a constant at a given pressure and temperature. It is not dependent upon the shear stress imposed on the fluid or on the length of time during which the stress is imposed.

when a fluid does not have this linear relationship between shear stress and shear rate, it is called non-Newtonian. This viscosity of a non-Newtonian fluid is not constant at a given temperature and pressure; it depends on other factors, such as the rate of shear or the previous history of the fluid. Since non-Newtonian fluids do not have a linear relationship between shear stress and shear rate, their consistency is called an apparent viscosity which must be related to a given shear rate and the shear history of the fluid.

Pseudoplasticity is a characteristic of a non-Newtonian fluid which is not related to its prior shear history. A fluid may have pseudoplastic characteristics whether it was under high shear or quiescent prior to determining its shear stress-shear rate relationship. A pseudoplastic fluid has a high shear stress at low rates of shear and a high apparent viscosity. As the shear increases, the shear stress does not rise proportionately and the apparent viscosity decreases. In an extrusion rheometer, a pseudoplastic solution may flow slowly at low pressure, but doubling the pressure may cause four times the flow.

Thixotropy is a time-related characteristic of a non-Newtonian fluid. In fluids having this characteristic, the apparent viscosity at a given rate of shear will decrease with time. Thixotropy is a reversible process and thixotropic fluids will have a characteristic hysteresis loop on a shear rate-shear stress plot.

FIGS. 2 and 3 are shear stress-shear rate curves which illustrate the pseudoplastic and thixotropic characteristics of an aqueous solution of the compositions of this application.

FIG. 2 illustrates the pseudoplastic characteristics of an aqueous solution of compositions prepared in accordance with the teaching of this application. The solution of FIG. 2 was prepared by adding the product of Table III to water containing 3 weight percent sodium carbonate. The concentration of the total product in the solution was 2.9 weight percent and the concentration of the sulfonates was 2.2 weight percent. The apparent viscosity of the resulting solution was measured at 26°C. Note that at low shear rates, the slope of the curve is very steep and therefore the apparent viscosity is high. The slope of the curve decreases at higher rates of shear, and there is a lower apparent viscosity at these high shear rates.

FIG. 3 illustrates the time-dependence of the apparent viscosity of solutions of the compositions of this invention. The solution of FIG. 3 was prepared in the same manner as the solution used to illustrate the pseudoplastic plastic characteristics. The measurements of FIG. 3 were also made at 26°C. FIG. 3 has the characteristic hysteresis loop of a fluid with thixotropic characteristics.

It has been found that surfactant solutions made in accordance with the teaching of this application have an equilibrium apparent viscosity. These surfactant solutions will reach an apparent viscosity which will remain constant with time when sheared at a given rate for a period of time. This constant viscosity is termed the equilibrium apparent viscosity. It is not dependent on prior shear history, but will vary with shear rate.

FIG. 4 illustrates the manner of determining the equilibrium apparent viscosity for a typical surfactant solution of this invention. Solutions were prepared in the same manner and in the same concentrations as the solutions used to illustrate the pseudoplastic and thixotropic properties of aqueous solutions of the compositions of this invention. Three such solutions were subjected to a shear rate of approximately 230 reciprocal seconds for a breif period of time to reduce the apparent viscosity of the solutions to a minimum value of approximately 6 centipoises. These three solutions wre then subjected to shear rates of 5.75 reciprocal seconds, 11.5 reciprocal seconds, and 23 reciprocal seconds. These solutions were sheared at these rates until the apparent viscosity of each solution remained essentially unchanged.

Three additional samples were prepared in the same manner. After mixing, the samples were set aside and remained in a quiescent state for several days to increase the apparent viscosities to a high value. These solutions were then subjected to shear rates of 5.75 reciprocal seconds, 11.5 reciprocal seconds, and 23 reciprocal seconds until their apparent viscosity remained essentially unchanged.

It was found that two samples which were sheared at the same rate would reach the same equilibrium viscosity independent of their prior shear history. As shown in FIG. 4 the two solutions which were subjected to a shear rate of 5.75 reciprocal seconds attained an equilibrium apparent viscosity of approximately 32 centipoises. The two solutions which were sheared at 11.5 reciprocal seconds attained an equilibrium apparent viscosity of approximately 25 centipoises and the two solutions which were sheared at 23 reciprocal seconds attained at equilibrium viscosity of approximately 18 centipoises. The temperature of all solutions was held at 26°C during these measurements.

All of the compositions made in accordance with the teaching of this application will exhibit these non-Newtonian characteristics to varying degrees. FIGS. 2, 3, and 4 were prepared using one such composition. Other compositions, depending on a vast number of variables such as feed stock, sulfonation conditions, neutralization conditions, deoiling and desalting procedures, will show these same characteristics to a greater or lesser extent. It should be understood that FIGS. 2, 3, and 4 are illustrative of these characteristics and the values shown for this composition are not to be construed as absolute criteria for all compositions of this invention. Moreover, it should be noted that while the solutions illustrated in FIG. 4 reached equilibrium viscosities at approximately the same time, this may not be true with solutions of other compositions.

The magnitude of the equilibrium apparent viscosity at a given shear rate will vary considerably. It will depend in part on the feed stock employed and the reactor conditions during sulfonation. A composition made in accordance with the teaching of this application is satisfactory for its intended purpose if the equilibrium apparent viscosity of two weight percent of the composition in a three percent sodium carbonate aqueous solution is at least 10 centipoises measured at 5.75 reciprocal seconds.

Figure 5:
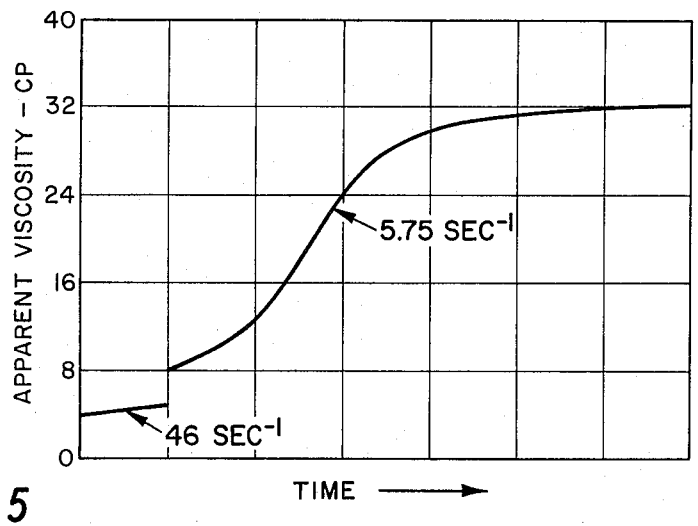
FIG. 5 is a graph of the apparent viscosity of aqueous solutions of these compositions with time and changing shear rates.

FIG. 5 qualitatively illustrates the viscosity variations of the solutions of the compositions of this invention under conditions similar to those which would prevail during injection of the solution into an oil-bearing formation and during the movement of the solution through the formation. When the solution is initially injected into the wellbore, it is subjected to extremely high shear rates as it travels through the injection pumps, tubing and casing perforations. However, the shear imposed on the solution immediately begins to decrease as the solution is displaced from the wellbore and into the formation. At a given injection rate, the speed at which the solution moves through the formation and the rate of shear on the solution will decrease approximately in proportion to the square of the distance from the wellbore. As the solution moves through the formation at a decreasing velocity, the non-Newtonian characteristics of the solution cause the apparent viscosity of the solution to increase.

FIG. 5 is illustrative of the viscosity behavior of the solution as it moves through the reservoir. The vertical axis represents the apparent viscosity of the solution. The horizontal axis represents the time lapse from injection and is also proportional to the distance between the solution front and the wellbore. To illustrate the effect of the extreme shear imposed on the solution as it moves through the well and perforations, a solution was sheared at a rate of approximately 230 reciprocal seconds for a brief period of time. Following this initially high shear, the solution was subjected to an intermediate shear rate of 46 reciprocal seconds for a brief period of time to give a qualitative representation of the average shear imposed on the fluid in the immediate vicinity of the wellbore. The shear rate imposed on the fluid was then reduced to 5.75 reciprocal seconds to illustrate the apparent viscosity-time relationship of the fluid as it moved through the formation. It should be recognized that as the fluid moves through the formation, it will not remain at a constant shear rate for more than a brief period of time, and there will be no sharp changes in shear rate as is illustrated. FIG. 5 is merely a qualitative illustration of the change of the viscosity of the solution as it moves through the oil-bearing formation. The measurements illustrated in FIG. 5 were made at 26°C on a solution which was comparable to those used in FIG. 2, 3, and 4.

Table IV illustrates the remarkable ability of solutions of compositions of this invention to reduce the interfacial tension between typical crude oils and brines. The normal interfacial tensions between these fluids will be as high as 15 to 30 dynes/cm. As can be seen from Table IV, the compositions of this invention will reduce the interfacial tension to approximately 0.01 dynes/cm or less. These interfacial tensions were measured by adding the product of Table III to two brine solutions. The concentrations of the product in these solutions were 2.9 and 1.45 weight percent. The corresponding sulfonate concentrations were 2.2 and 1.1 weight percent. The interfacial tension between the crude oil and sulfonate-brine solutions were measured by the capillary rise method at approximately 22°C.

TABLE IV

| Sulfonate Concentration | Oil | Brine | Interfacial Tension dynes/cm |
|---|---|---|---|
| 2.2% | French Crude 34° API Gravity | 1% Na₂CO₃ | .013 |
| 1.1% | French Crude 34° API Gravity | 1% Na₂CO₃ | .004 – .017 |

The values of interfacial tension between crude oils and brines in the presence of these compositions are not easily obtained. The values are so low that they are difficult to measure using standard laboratory techniques such as pendent drop or capillary rise. In addition, these techniques require visual observations of the interface during the measurement. Since solutions of these compositions and many crude oils have a brown coloration, the interface may be difficult to distinguish.

As a standard of comparison, cyclohexane-water solutions were used to measure the interfacial tension reducing properties of these surfactants. The products produced under the reaction conditions of Runs 1, 2, and 3, Table II, were treated to remove water, unreacted oil and inorganic salts. The remaining dried residue consisted essentially of pentane-insoluble sulfonates and water-insoluble sulfonates. The dried samples were then added in concentrations of 0.5 weight percent to 4 ml of water containing 1 percent sodium chloride. These solutions were mixed with equal volumes of cyclohexane and allowed to settle. After the liquid phases had separated, the interfacial tensions between the aqueous and cyclohexane phases were measured by the capillary rise method at room temperatures (approximately 22°C). The normal interfacial tension between cyclohexane and a water solution containing 1 percent sodium chloride is approximately 40 dynes/cm at room temperature. A surface-active agent would be considered satisfactory in most instances for oil recovery if it could lower the interfacial tension of such a cyclohexane-brine system to a 0.1 dynes/cm. The surface-active agents of this invention reduce this interfacial tension to a level many times less. Interfacial tensions of less than 0.01 dynes/cm were recorded on all samples tested.

Measured amounts of the sulfonated hydrocarbons of the compositions of this invention, may be subjected to elemental analysis to determine average empirical formulas for these sulfonates. These samples are burned in an oxygen stream in a standard combustion chamber and the effluent gas stream subjected to a standard gas chromatographic analysis to determine the amounts of carbon and hydrogen present in the sample. The residue ash in the combustion chamber will be a measure of the content of the cation of the sample, such as sodium. The sulfur content is determined using standard oxidation procedures. The oxygen content may be determined by neutron activation analytical techniques or by difference as it is commonly done in such analyses. From such an elemental analysis, the average empirical formula for a number of sulfonated hydrocarbon samples has been determined to approximate:

$$C_xH_y[SO_3M]_z$$

where $M$ is a monovalent cation such as sodium or ammonium $x$ varies from 28 to 44

$y$ varies from 40 to 58

$z$ varies from 1.2 to 1.5

In certain of the samples which were subjected to elemental analysis, trace amounts of excess sodium were noted. This excess sodium was probably due to unreacted base carried over in the final product. Also, in some samples, excess oxygen (probably due to carry over base or oxygenated hydrocarbons in the feed stock) and excess sulfur (probably due to the presence of thio-compounds in the feed stock) were noted. These trace excess quantities have not been stated in the empirical formula in the interests of simplication.

It should be understood that the empirical formula derived is representative of the gross mixture of sulfonated hydrocarbons contained in the sample. The individual molecular constituents may vary from low molecular weight mononuclear aromatic hydrocarbons to high molecular weight polynuclear aromatics. Also, the degree of sulfonation in the formula is stated as an average of 1.2 to 1.5. The individual molecules will generally have from one to three sulfonate groups per molecule.

Figure 6:
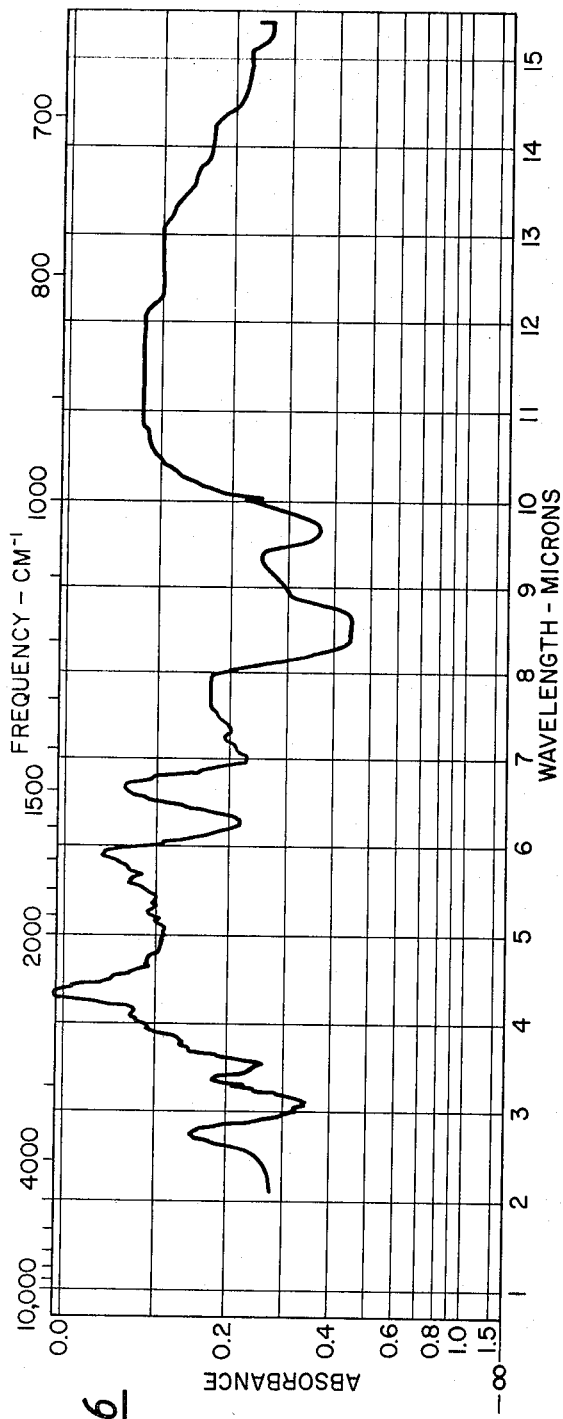
FIG. 6 is the infra-red spectra of the sulfonates of this invention.

FIG. 6 is an infra-red absorption curve of a composition of this invention which has been treated to remove inorganic salts and unreacted oil. The composition used was that obtained under the reaction conditions of Run 1, Table II. The sample was embedded in a pellet of KBr and analyzed in a double beam infra-red spectrometer to eliminate the KBr background. The curve obtained is the infra-red absorbance, which is equal to the negative base 10 logarithm of the infra-red transmission, plotted against the frequency in reciprocal centimeters and the wave length in microns. In general, the absorbance bands are not sharply defined, and other samples may exhibit slightly different widths and slightly different degrees of absorbance for the characteristic bands.

Figure 7:
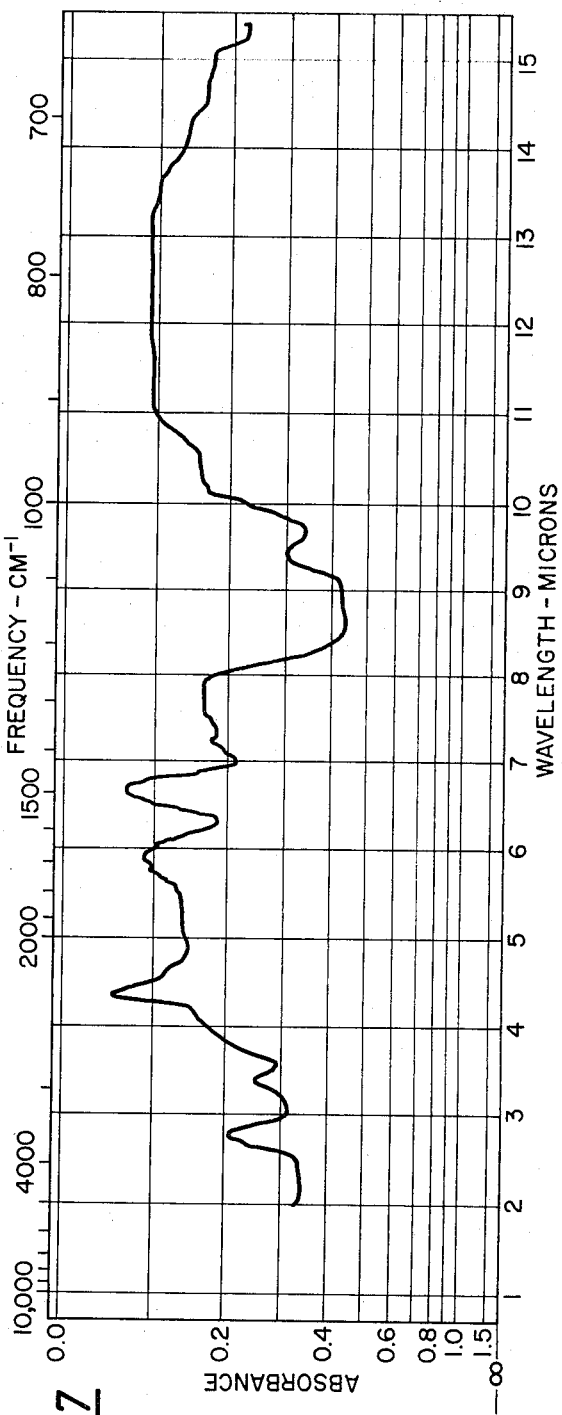
FIG. 7 is the infra-red spectrum of the sulfonates and associated inorganic salts and hydrocarbon oil.

FIG. 7 is an infra-red absorbance curve of the same composition without removal of the inorganic salt and unreacted oil. FIGS. 6 and 7 exhibit similar characteristic absorbance bands. These bands occur at approximately:

TABLE VI

Wave Length in Microns 3.2

3.6

6.3

7.0

7.3

8.7

9.7

Figure 8:
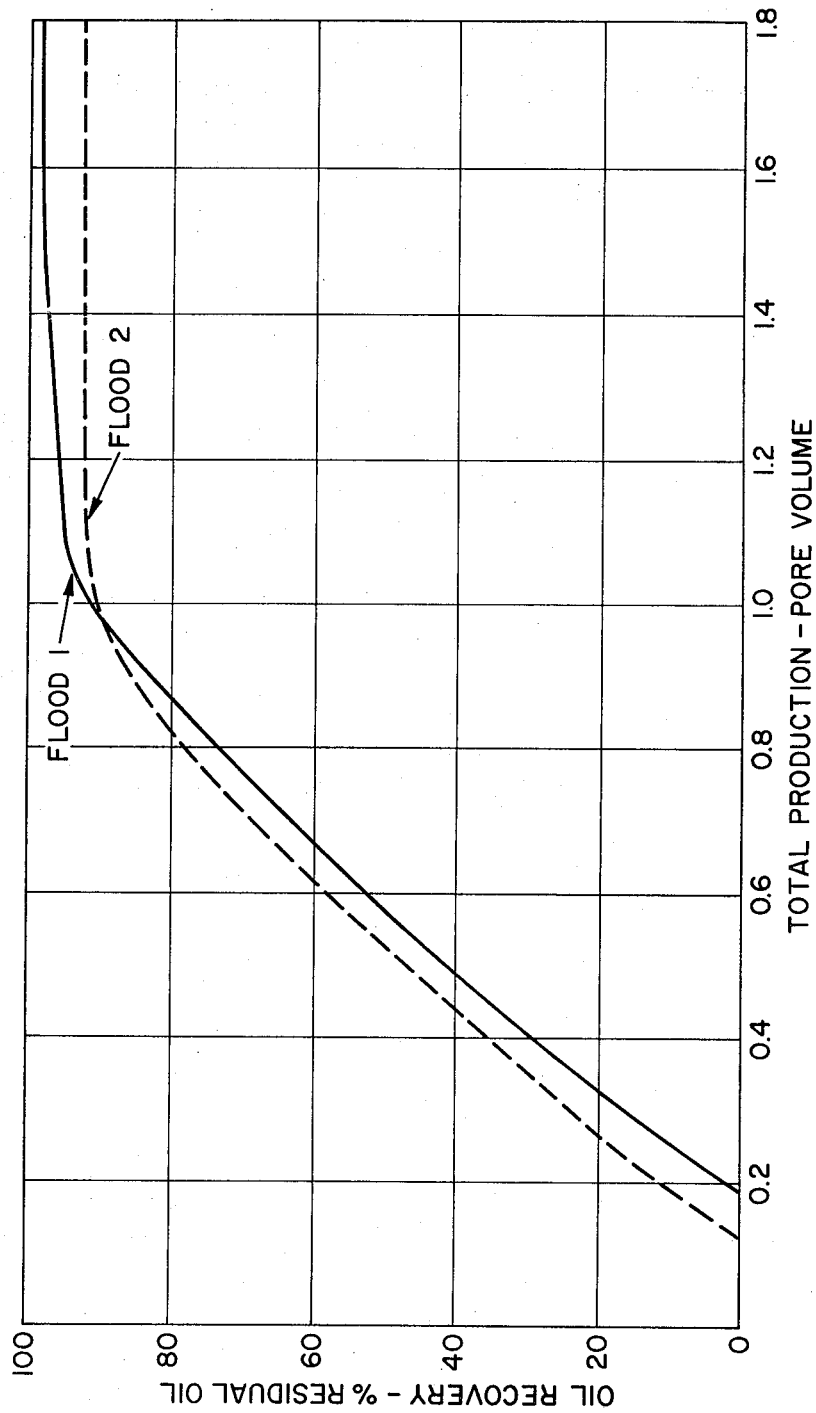
FIG. 8 illustrates the recovery of waterflood residual oil from a sandstone core using aqueous solutions of these compositions.

FIG. 8 shows the recovery obtained in core floods using the surfactants of this invention. The cores utilized in these floods were four foot sections of Berea sandstone having a permeability of approximately 250 md. These cores were flooded to saturation with a 1.5 weight percent NaCl brine and then flooded with a 42° API gravity Illinois crude oil until essentially no further brine was produced. The cores were then flooded with the brine until no further crude oil was produced. The residual oil saturation for Flood 1 was 36.7 percent pore volume and for Flood 2 was 40.1 percent. A 50% pore volume bank of an aqueous solution of 2.9 weight percent of the product of Table III and 1.0% Na$_2$CO$_3$ was injected into the cores. The surfactant solution was then displaced with the brine solution and additional oil was recovered as shown in FIG. 8. The remarkable oil recovery properties of these surfactants is illustrated not only by the extremely high quantities of oil recovered, over 90 percent of the residual oil saturation, but also by the low injection volumes necessary to recover the oil. After one pore volume of fluid had been injected, essentially all of the recoverable oil had been produced.

The principal use for the compositions of this invention is as an additive to flood water in secondary and tertiary well recovery processes. The composition also has application during primary recovery of the reservoir oil. For instance, aqueous solutions of these compositions may be be injected into a reservoir having a flank or bottom water drive. Such a method assists the natural displacement forces existing within the reservoir.

Normally, the surfactant solutions will be used in recovery operations where the solution is injected into the formation by means of one or more wells and driven through the oil-bearing formation toward offsetting, producing wells. It is contemplated that these surfactant solutions may be employed in single well operations. For example, the surfactant solutions may be employed to decrease the oil saturation in the formation near a water injection well and, hence, increases the water injectivity of such a well. In an operation of this type, the surfactant solution will be injected into the formation in a volume sufficient to extend from 2 to 10 feet from the injection wellbore and then withdrawn through the same wellbore. As another example, the surfactant solution may be injected into the formation at one vertical level of the wellbore and displaced oil withdrawn at another vertical level of the same wellbore.

The amount of the composition in aqueous solution to be employed in a given oil recovery operation may vary considerably depending on a number of factors. For instance, it is known that divalent ions such as calcium and magnesium have a tendency to precipitate sulfonated hydrocarbons in aqueous solutions. where such ions are present in high amounts in the connate water, a higher concentration of the composition would be employed to offset this effect. It has also been noted that certain crude oils are more effectively recovered than other crudes by these compositions. Where core displacement tests indicate that a given crude oil is difficult to displace, the concentration of the composition in the flood water should be increased. Other factors which should be considered are the tendency of the sulfonated hydrocarbon to be adsorbed on the oil-bearing formation and the ability of the composition to reduce the interfacial tension between the flood water and the particular crude oil to be recovered. The concentration may be governed to a degree depending on whether the composition is added to the flood water continuously throughout the oil recovery operations or whether it is to be added in aqueous slugs or banks. When injected continuously throughout the recovery operation, the concentration will normally be less than when a slug or bank of the solution is employed.

When continuously injected throughout the oil recovery operation, concentrations of about 0.5 weight percent of the composition in the aqueous component will normally be used. When injected in the form of concentrated banks, the amount of composition may range up to the limits of solubility of the material in the aqueous medium. Normally, however, the concentration will range from 1 to 5 weight percent and preferably about 2 weight percent.

Materials not incompatible with the practice of the invention may be added to the solutions of these compositions. Water-soluble, viscosity-increasing agents are potentially very attractive for use in the flood water used to displace banks or slugs of the surfactant solution through the reservoir. Representative viscosity-increasing agents are partially hydrolyzed polyacrylamides and heteropolysaccharides of the type disclosed in U.S. Pat. No. 3,305,016, Lindblom et al. Small amounts of materials, such as bactericides, rust preventives, colloidal dispersants, solubilizers, chelating agents, water-softening agents, and the like, may also be used in the practice of this invention.

A typical use of the compositions of this invention might be carried out in the following manner:

A petroleum reservoir is waterflooded in a conventional manner to a residual oil saturation of about 30 percent of the reservoir pore volume. A concentrated aqueous solution containing the product solids of Table III is diluted with a typical oil field brine until the sulfonate concentration is reduced to approximately 2 weight percent. The volume of diluted surfactant solution should be approximately 30 percent of the reservoir volume. This volume of surfactant solution is injected into the reservoir and followed by a 30 percent pore volume of flood water containing 0.05 weight percent of a heteropolysaccharide. The thickened flood water will have a viscosity of approximately 10 cps. The surfactant and thickened water banks are then displaced toward a producing well by the injection of oil field brine. Displaced reservoir oil is rcovered from the producing well.

We claim

1. A method of recovering oil from a subterranean formation comprising injecting into the formation an aqueous solution containing a waterflood additive, said additive having the property of reducing the interfacial tension between the reservoir oil and the aqueous solution to less than 0.1 dyne/cm and having the property of imparting pseudoplastic and thixotropic non-Newtonian viscosity characteristics to water containing 3 percent by weight sodium carbonate, and recovering oil from the formation.

2. A method as defined in claim 1 wherein the concentration of the waterflood additive in the aqueous solution is at least 0.5 weight percent.

3. A method as defined in claim 1 wherein the concentration of the waterflood additive in the aqueous solution is less than the solubility limit of the additive in the solution.

4. A method as defined in claim 1 wherein the concentration of the waterflood additive in the aqueous solution is approximately 2 weight percent.

5. A method as defined in claim 1 wherein the volume of aqueous solution injected is approximately 30 percent of the formation pore volume.

6. A method as defined in claim 1 further comprising injecting a thickened water solution into the formation to displace the aqueous solution.

7. A method as defined in claim 6 wherein the volume of the thickened water solution is approximately 30 percent of the formation pore volume.

8. A method as defined in claim 6 wherein the thickened water solution and aqueous solution are displaced into the reservoir by water.

9. A method as defined in claim 1 wherein the aqueous solution is injected into the formation by means of one well penetrating the formation and the oil is recovered by means of another well penetrating the formation.

10. A method as defined in claim 1 where the aqueous solution is injected into the formation and the oil is recovered by means of a well penetrating the formation.

11. A method as defined by claim 1 wherein the additive has the property of at least doubling the pseudoplastic viscosity of water containing 3 percent by weight sodium carbonate at a shear rate of 230 reciprocal seconds.

12. A method as defined by claim 1 wherein the additive has the property of increasing the equilibrium apparent viscosity of water containing 3 percent by weight sodium carbonate to at least 10 centipoises at 26°C and 5.75 reciprocal seconds when present in said solution at a concentration of 2 weight percent.

13. A method of treating a subterranean formation comprising injecting into the formation an aqueous solution containing a composition consisting essentially of sulfonated hydrocarbons, said composition having the property of reducing the interfacial tension between an aqueous phase and a non-aqueous phase to less than 0.1 dyne/cm at approximately 22°C when added to a concentration of 0.5 weight percent to the aqueous phase, the aqueous phase consisting of 0.1 weight percent sodium chloride and the remainder water, the non-aqueous phase consisting of cyclohexane, and said composition having the property of imparting pseudoplastic and thixotropic non-Newtonian viscosity characteristics to a solution containing 3 percent by weight sodium carbonate, 0.3 weight percent sodium sulfate, 0.4 weight percent hydrocarbon oil and the remainder water.

14. A method as defined in claim 13 wherein the composition has characteristic infra-red absorption bands occurring approximately at:

Wave Length in Microns 3.2

3.6

6.3

7.0

7.3

8.7

9.7

15. A method as defined in claim 13 wherein the compound has an approximate empirical formula of:

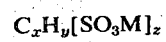

where
M is a monovalent cation
x is from 28 to 44
y varies from 40 to 58
z varies from 1.2 to 1.5

16. A method as defined in claim 15 wherein M is sodium.

17. A method as defined by claim 15 wherein M is ammonium.

18. A method as defined by claim 13 wherein the composition is highly soluble in polar liquids, highly insoluble in non-polar liquids, and hygroscopic.

19. A method of displacing oil in a subterranean oil formation which comprises injecting into the formation an aqueous solution of a surfactant composition comprising a mixture of hydrocarbon sulfonates, said surfactant composition being capable of imparting an equilibrium apparent viscosity of at least 10 centipoises at 26°C and at a shear rate of 5.75 reciprocal seconds to an aqueous system consisting of 2 weight percent of said surfactant composition, 3 weight percent sodium carbonate, 0.3 weight percent sodium sulfate, 0.4 weight percent hydrocarbon oil, and the remainder water, said surfactant composition being further capable of lowering the interfacial tension between cyclohexane and water containing 1 weight percent sodium chloride and 0.5 weight percent of said surfactant composition to a value no greater than 0.1 dyne/cm at about 22°C, said surfactant composition being further capable of imparting pseudoplastic and thixotropic non-Newtonian viscosity characteristics to said aqueous system.

20. A method as defined in claim 19 in which said surfactant composition comprises a mixture of petroleum hydrocarbon sulfonates.

21. A method as defined in claim 20 in which the petroleum hydrocarbon sulfonates are derived from the sulfonation of hydrocarbons of the type occurring in a 700°–1,100°F boiling range of petroleum crude oil.

22. A method as defined in claim 21 in which the petroleum hydrocarbon sulfonates are formed by sulfonating said hydrocarbons with sulfur trioxide in a thin film reactor.

23. A method as defined in claim 21 in which the hydrocarbon sulfonates have an approximate empirical formula of:

$$C_xH_y[SO_3M]_z$$

where
 $x$ is from 28 to 44
 $y$ is from 40 to 58
 $z$ is from 1.2 to 1.5, and
 $M$ is a monovalent cation.

24. A method as defined in claim 23 in which M is sodium.

25. A method as defined in claim 23 in which M is ammonium.

* * * * *